United States Patent [19]

Nahm et al.

[11] Patent Number: 5,330,006
[45] Date of Patent: Jul. 19, 1994

[54] OIL MUD DISPLACEMENT WITH BLAST FURNACE SLAG/SURFACTANT

[75] Inventors: James J. W. Nahm, Houston; Kenneth M. Cowan, Sugar Land; Reece E. Wyant, Houston, all of Tex.

[73] Assignee: Shell Oil Company, Houston, Tex.

[21] Appl. No.: 24,117

[22] Filed: Feb. 25, 1993

Related U.S. Application Data

[63] Continuation-in-part of Ser. No. 964,988, Oct. 22, 1992.

[51] Int. Cl.$^5$ .............................................. E21B 33/14
[52] U.S. Cl. ........................................ 166/293; 175/65
[58] Field of Search ................... 166/292, 293; 175/65

[56] References Cited

U.S. PATENT DOCUMENTS

| | | |
|---|---|---|
| 2,336,723 | 12/1943 | Drummond et al. . |
| 2,649,160 | 8/1953 | Williams et al. . |
| 2,776,112 | 1/1957 | Ilfrey et al. ............... 166/293 X |
| 2,822,873 | 2/1958 | Harmsen et al. . |
| 2,889,329 | 8/1959 | Lyons . |
| 3,077,740 | 2/1963 | Hemwall . |
| 3,111,006 | 11/1963 | Caron . |
| 3,499,491 | 3/1970 | Wyant et al. . |
| 3,557,876 | 1/1971 | Tragesser . |
| 3,887,009 | 6/1975 | Miller et al. . |
| 3,964,921 | 6/1976 | Persinski et al. . |
| 4,014,174 | 3/1977 | Mondshine . |
| 4,450,009 | 5/1984 | Childs et al. . |
| 4,518,508 | 5/1985 | Conner . |
| 4,643,617 | 2/1987 | Kanno et al. . |
| 4,674,574 | 6/1987 | Savoly et al. . |
| 4,690,589 | 9/1987 | Owa . |
| 4,692,065 | 9/1987 | Suzuki et al. . |
| 4,746,245 | 5/1988 | Mork . |
| 4,761,183 | 8/1988 | Clarke . |
| 4,897,119 | 1/1990 | Clarke . |
| 5,020,598 | 6/1991 | Cowan et al. . |
| 5,058,679 | 10/1991 | Hale et al. . |
| 5,082,499 | 1/1992 | Shen . |
| 5,101,902 | 4/1992 | Parcevaux et al. . |
| 5,106,423 | 4/1992 | Clarke . |
| 5,106,711 | 5/1992 | Cowan . |
| 5,133,409 | 7/1992 | Bour et al. ............... 166/293 |
| 5,133,806 | 7/1992 | Sakamoto et al. . |
| 5,147,565 | 9/1992 | Bour et al. . |
| 5,207,831 | 5/1993 | Cowan ............... 166/293 X |
| 5,213,160 | 5/1993 | Nahm et al. ............... 166/293 |

FOREIGN PATENT DOCUMENTS

| | | |
|---|---|---|
| 61-48454 | 3/1986 | Japan . |
| 833704 | 6/1981 | U.S.S.R. . |
| 2216574A | 10/1989 | United Kingdom . |

Primary Examiner—George A. Suchfield

[57] ABSTRACT

A cementitious slurry containing blast furnace slag and a surfactant is utilized to displace an oil based drilling fluid without causing contamination by the blast furnace slag cement. In a specific embodiment, a cementitious slurry comprising blast furnace slag, a surfactant and water is used in the cementing of an annulus surrounding a casing or liner wherein a synthetic oil-containing drilling fluid is present.

20 Claims, 1 Drawing Sheet

U.S. Patent
July 19, 1994
5,330,006
FIG. 1
FIG. 2
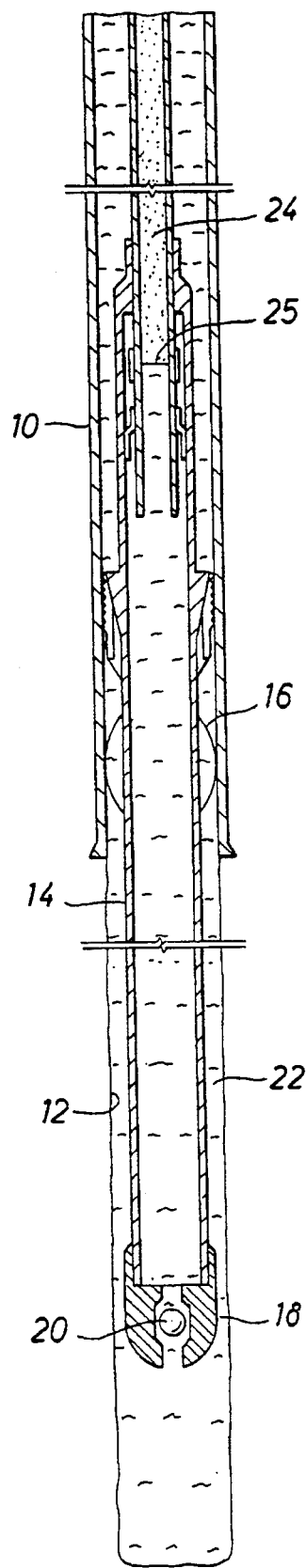
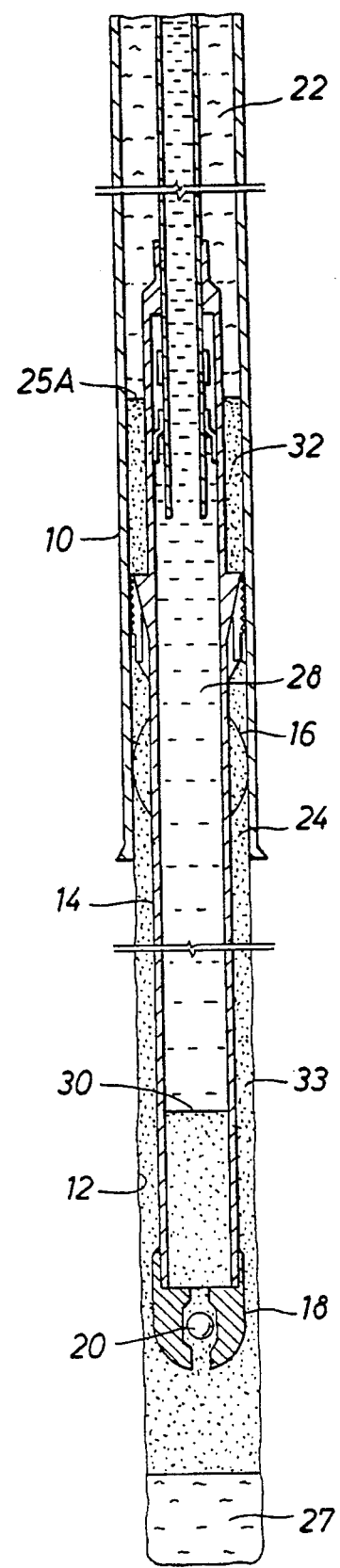

OIL MUD DISPLACEMENT WITH BLAST FURNACE SLAG/SURFACTANT

CROSS REFERENCE TO RELATED APPLICATIONS

This is a continuation-in-part of copending application Ser. No. 964,988 pending filed Oct. 22, 1992, the disclosure of which is hereby incorporated by reference.

BACKGROUND OF THE INVENTION

This invention relates to drilling and cementing boreholes.

The drilling of boreholes is generally carried out using a rotary drilling process. The rotary drilling of a borehole is accomplished by rotating a drill string having a drill pipe and a drill bit at its lower end. Weight is applied to the drill bit while rotating to create a borehole into the earth. The drill string is hollow and sections are added to the drill string to increase its length as the borehole is deepened. This rotary drilling process creates significant amounts of friction which produces heat along with fragments of the strata being penetrated. The fragments of the strata must be removed from the borehole and the drill bit must be cooled to extend its useful life. Both of these necessities are accomplished by the circulation of a fluid down through the drill string and up to the surface through the annulus between the drill string and the wall of the borehole.

Once the borehole has been drilled to the desired depth, it may be desirable to isolate the separate areas, zones or formations transversed by the borehole. For extraction of fluids from formations, and for protection against borehole collapse, one or more conduits (casings) must be inserted into the borehole extending from the surface downward. Thereafter, liners may be hung inside the casings.

At this point it becomes necessary to fill the annulus between the casing and the borehole wall or between the liner and casing with a cementitious material which will seal the annulus to inhibit communication between various formations penetrated by the wellbore and which will provide structural support for the casing or liner. This is commonly referred to as primary cementing.

Generally, the borehole, into which the casing or liner to be cemented is installed, is filled with drilling mud. Therein lie several problems. Conventional Portland cement and conventional drilling muds are incompatible. Thus, as the cement is forced down the casing or liner and up into the annulus it is commingled with the drilling mud at any interface between the mud and the cement. The resulting mixture generally thickens or becomes a gel and does not set up into a strong cement. In addition, the gel strength and viscosity become uncontrollable and the mixture may either become too viscous to pump or may get thinner. If the mixture gets thinner it can allow solids to settle downward in the annulus where they may bridge and restrict the passage of the cement slurry. In either event, the situation is unsatisfactory.

The industry has developed a complex system to attempt to circumvent this problem. A device generally known as a landing collar is attached to the bottom of the casing or liner being cemented. The landing collar has an annular shoulder projecting inwardly. A first wiper plug with a diaphragm which can be ruptured is introduced into the casing or liner followed by a spacer fluid, the cementitious slurry and finally, a solid wiper plug. Displacement fluid then pushes the solid wiper plug downward thus displacing the spacer fluid and the cementitious slurry through the ruptured first wiper plug, out of the casing or liner and into an area at the bottom thereof where it changes direction and flows upwardly into the annulus. When the second wiper plug reaches the area of the landing collar it is stopped by the first wiper plug which is resting on the shoulder.

The spacer fluid, however, can create its own set of problems because it mixes somewhat with both the drilling mud ahead of it and the cementitious slurry behind it. Usually, the most damaging is the contamination of the drilling mud. The spacer fluid remains a fluid in admixture with the drilling fluid and thus cannot be easily separated therefrom. In many instances this necessitates the disposing of the thus-contaminated drilling fluid. This is an economic problem with any drilling fluid but with more expensive, less environmentally friendly oil based fluids, it is a major obstacle to successful operation. In addition, the mixture of spacer fluid and drilling fluid usually results in a more viscous material thus exacerbating the pumping problems. This can even result in a total failure of the cement job because a good seal at the top of the liner may not be obtained and this is where any cement weakened by drilling fluid contamination most likely will be.

It has been found by Hale and Cowan, U.S. Pat. No. 5,058,679 (Oct. 22, 1991) that blast furnace slag is compatible with drilling fluids, and that excellent cementitious compositions can be produced by combining blast furnace slag and drilling fluids. Even blast furnace slag, however, can contaminate oil based drilling muds when the two are mixed. Parceveaux et al., U.S. Pat. No. 5,101,902 (Apr. 7, 1992) broadly discloses spacers between mud and cement and discloses adjusting the density with weighting agents including barite and fillers.

Oil based drilling fluids are disclosed in Shell Internationale patent GB 2,223,255A (Apr. 4, 1990). Cowan, U.S. Pat. No. 5,016,711 (May 21, 1991) broadly discloses improved cement adhesion through the use of a surfactant.

SUMMARY OF THE INVENTION

It is an object of this invention to cement a casing or liner in a wellbore drilled with an oil based drilling fluid without the necessity for a wiper plug or a float collar.

It is a further object of this invention to cement a casing or liner in a wellbore drilled with an oil based drilling fluid without rendering the drilling fluid useless for further drilling operations.

It is yet a further object of this invention to avoid having to treat an oil based drilling fluid contaminated with cement and/or spacer fluid.

It is yet a further object of this invention to minimize or eliminate disposing of drilling fluid which is contaminated with cement and/or spacer fluid.

It is yet a further object of this invention to avoid viscosity or gelation problems during primary cementing in wellbores drilled using an oil based drilling fluid.

In accordance with this invention, a borehole is drilled utilizing an oil based drilling fluid; thereafter a cementitious slurry comprising water, a surfactant, and blast furnace slag is introduced to displace the drilling fluid.

BRIEF DESCRIPTION OF THE DRAWINGS

In the drawings, forming a part hereof, wherein like reference characters denote like parts in the various views, FIG. 1 is a cross sectional representation of a borehole filled with drilling fluid after a liner has been inserted preparatory to displacing the drilling fluid out with a cementitious slurry; and FIG. 2 is a cross sectional view of the borehole at a later stage in the process wherein the liner is cemented.

DETAILED DESCRIPTION OF THE INVENTION

It has been discovered that by utilizing a surfactant in a blast furnace slag cementitious slurry, an oil based drilling fluid can be displaced without destructive contamination of the drilling fluid.

Definitions

In this description the term 'cementitious material' means blast furnace slag which, on contact with water or water and activators, hardens or sets into a solidified composition.

An aqueous slurry of cementitious material and the component or components which cause it to harden is referred to herein as a 'cementitious slurry'.

By 'direct fluid contact' between the displacement fluid and the cementitious slurry is meant that the displacement fluid directly contacts the upper surface of the column of cementitious slurry as opposed to having a solid wiper plug disposed between the cementitious slurry and the displacement fluid. By 'direct fluid contact' between the cementitious slurry and the drilling fluid or mud is meant that the cementitious slurry directly contacts the upper surface of the column of drilling fluid or mud in a pipe as opposed to having a wiper plug with a rupturable diaphragm disposed between the cementitious slurry and the drilling fluid or mud. This is of particular value in cementing large diameter pipe, i.e., pipe having an outside diameter of 12 to 30 inches, generally 16-inch or greater.

The term 'pipe' means either a casing or a liner.

The term 'primary cementing' refers to any cementing operation wherein a cementitious slurry is passed into an annulus surrounding a pipe and thus encompasses both the cementing of casings wherein the annulus is between the casing and the borehole wall and the cementing of liners where the annulus includes an annulus between the liner and the casing.

By 'activator system' is meant either a single activator or a mixture of activators used for setting of blast furnace slag.

As used herein 'down' or 'bottom' as it relates to a drill string or casing, means in a direction toward the farthest reach of the borehole even though in rare instances the borehole can be disposed in a horizontal position. Similarly, 'up' or 'top' means back toward the beginning of the borehole.

Process Detail

Referring now to FIG. 1, there is shown an initial stage in a cementing operation wherein a wellbore has been drilled in a subterranean formation, the drill string removed and a liner hung in an existing casing. A casing 10 is shown in an upper portion of the wellbore and a further extension of the wellbore as defined by wellbore walls 12 is depicted. Disposed within the wellbore is a liner pipe 14 to be cemented in place. A centralizer 16 centers the liner pipe. A casing joint equipped with a float shoe 18 having a valve 20 is affixed to a lower portion of the liner. The borehole from the bottom all the way to the surface, is filled with drilling fluid or mud from the drilling operation, the drilling fluid or mud being depicted by reference character 22. Cementitious slurry 24 is disposed above the drilling fluid in direct fluid contact therewith at interface 25. Some cementitious slurry/drilling fluid mixing occurs at interface 25. Most of the mixing, however, occurs at corresponding interface 25A as depicted in FIG. 2, since flow through the annuli is more subject to mixing forces.

FIG. 2 shows a later stage in the cementitious slurry displacement in accordance with the invention. Drilling fluid 22 has been displaced by the surfactant-containing cementitious slurry 24 out of the liner and out of the annulus between the liner and the borehole (and between the liner and the casing), with some remaining in rat hole 27. The cementitious slurry is now displaced into the annulus surrounding the liner by displacement fluid 28. As can be seen, displacement fluid 28 is in direct fluid contact with the cementitious slurry at interface 30.

As can be further seen from FIG. 2, the displacement is stopped with the cementitious slurry/drilling fluid interface 25A near the top of the liner in annulus 32 between the liner and the casing. This is one of the most important areas in the cement job. The present invention results in a good quality cement here rather than a weak mixture of incompatible cement and drilling fluid as in the prior art when wiper plugs are not used. This good lead cement gives a good seal, thus ensuring that the well will pass a top of the liner pressure test.

This improvement flows from the fact that in the prior art the cementitious slurry and/or spacer fluid, in fact, mixes with the drilling fluids above it (in the annulus). As noted, the same is true in accordance with the invention. There is a region around interface 25A between cementitious slurry 24 and drilling fluid 22 as depicted in FIG. 2 wherein there is, in fact, a mixture of drilling fluid and cementitious slurry. However, the mixture of surfactant-containing blast furnace slag cementitious slurry 24 with oil based drilling fluid 22 does not give a bad reaction because the hydration product (cement) of the blast furnace slag is compatible with the drilling fluid and this compatibility is enhanced by the surfactant. This contrasts with Portland cement which, upon hydration, produces calcium hydroxide which is a major source of mud contamination. Because the blast furnace slag component of cementitious slurry 24 is a latent hydraulic material which will eventually set after contact with water, any cementitious slurry present in the drilling mud will form a solid with time. This reaction is speeded up by elevated temperatures. Any set solid which is later drilled out can be removed by shale shakers in the normal manner in which cuttings and other solid materials are removed from the drilling fluids. Those particles that may be too small to be removed by the shale shaker will be incorporated into the drilling mud as are normal drill solids. Blast furnace slag does not produce any reacted particles when set that are harmful to the drilling fluid. The setting reactions are completed and thus the set material will not react further to damage the mud.

While this has been described in connection with the cementing of a liner wherein the cementitious slurry is forced into the annular space 32 between the liner and the casing 10 or the annular space 33 between the liner and borehole 12, it is equally applicable to cementing a casing where the cementitious slurry is forced up into an annulus between a casing and the borehole wall.

Surfactant-containing blast furnace slag cementitious slurries can also be used in other primary cementing operations such as cementing a pipe by pumping the cementitious slurry directly into the annulus surrounding the pipe (reverse cementing) and in secondary cementing or remedial cementing operations where there is displacement of an oil based drilling fluid with a cementitious slurry.

Drilling Fluid

The oil-based drilling fluids generally contain, in addition to the oil, other additives such as viscosifiers, thinners, fluid loss additives, dissolved salts, solids from the drilled formations and solid weighting agents to increase the fluid density.

The term 'oil-based drilling fluids' is meant to cover muds having oil as the continuous phase, including low water content oil-base mud, 100% oil-based mud and invert oil emulsion mud.

The invention is applicable to all oil based drilling fluids. These fluids are expensive and hence the ability, through the use of this invention, to avoid destructive contamination, and thus waste, of the expensive oil based mud is of great economic and ecological significance. Indeed, the invention is particularly applicable for use with oil based drilling fluids utilizing the new and very expensive synthetic oils, vegetable and other natural oils which are biodegradable or which are formulated to avoid sheen. The drilling fluids recovered from drilling and cementing operations can be reused. In some instances, recovered drilling fluids are conditioned with additives before reuse.

Oil-base muds are often prepared in a liquid mud plant and transported to the well site. A premixing technique is employed using high shear mixing devices not only for convenience, but also for providing stable oil muds. Oil mud additives can be mixed on location and the mud properties can be changed to cope with changes in the downhole conditions. A variety of chemical are needed to prepare a complete mud system or to provide adequate control. The types of additives used can be grouped as follows:

Suspending (gelling) agents
Emulsifiers and wetting agents (Surfactants)
Filtration control agents
Viscosity control agents
Density control agents
Alkalinity control agents As noted above, the oil mud can either be a 100% oil-base mud, or it can be an oil-based continuous phase mud with a small amount of water as an internal phase. Some special considerations apply if the oil mud is an invert emulsion with a small amount of water as the internal phase.

For one thing, it is desirable to adjust the electrolyte concentration at which a given shale will neither swell nor dehydrate. These techniques involve adding sufficient NaCl, CaCl$_2$ or other salts to the water phase of the mud so that the chemical potential of the water in the mud is equal to the chemical potential of the water in the shale.

The term "activity" is used to define the unit of measure of the chemical potential for water in mud or shales. Shales adsorb water because of differences in chemical potential or activity or the water contained in the shales and that found in the mud. Water moves from a less concentrated solution to more concentrated solution in an attempt to equalize the concentrations. When the chemical potentials of the shales and the mud are in balance the movement of water is reduced to zero.

The hydration of shales in contact with oil muds is similar in mechanism to the osmosis of water through a semipermeable membrane (permeable to the solvent but not the solute). In oil muds the interfacial film surrounding each water droplet functions as a semipermeable membrane and the emulsified droplets function as osmotic cells when in contact with shale sections and/or shale cuttings.

It has been established that water transfer from the dispersed water droplets to the cuttings and/or formation can occur when the chemical potential of the formation water is greater than the chemical potential of the mud water. Conversely, the transfer of water from the formation may occur when the aqueous chemical potential in the water phase of the mud exceeds that of the formation.

The chemical potential of the mud is controlled by the type and concentration of electrolyte (NaCl, CaCl$_2$, (NH$_4$)$_2$SO$_4$, Ca(NO$_3$)$_2$, MgCl$_2$, ZnCl$_2$ or other salts) contained in the internal phase. The adsorptive potential of the formation is primarily a function of the degree of compaction to which that formation has been subjected. Generally, the older the formation, the greater the compaction and the higher the adsorption potential. The objective is to create an osmotic force in the mud which is equal to or greater than the adsorptive force of the formation drilled, thus preventing transfer of internal phase water to the formation.

Calcium chloride is the salt generally used to alter the activity of the water in the oil mud. Calcium chloride is quite soluble, allowing the activity to be varied over a wide range. It is available as technical grade, which is 75–80 percent in purity, or as pure (anhydrous) grade, 95–98 percent CaCl$_2$.

Herein lies a serious problem in the prior art. Calcium chloride is very detrimental to Portland cement because it is a potent accelerator for Portland cement. Hence if the emulsion breaks in an invert emulsion oil mud in contact with Portland cement it can cause major problems. The calcium chloride can accelerate the Portland cement slurry and the resulting slurry can become unpumpable and set up in the pumping system thus the cement job fails. In certain cases of cement failures, the well can be lost. Blast furnace slag, on the other hand, is quite compatible with salts in general including calcium chloride and, indeed, may even be enhanced by the presence of the salt.

Surfactants

The surfactant is preferably a material of the type commonly thought of as surfactants, i.e., one with a relatively high degree of detergency, as opposed to materials which may exhibit only a weak amount of detergency such as the lignosulfonates which are sometimes employed in drilling fluids. That is, it is preferably a material which is capable of producing oriented layers or micelles.

Usually, the surfactants as sold commercially in the oil industry are often 33–75 volume percent active ingredient in a solvent such as an alcohol. Broadly, based on the barrels of cementitious slurry, about 0.05 to about 50 lbs/bbl, preferably 0.1 to 15 lbs/bbl, most preferably 1 to 10 lbs/bbl can be used but this can vary depending on the particular surfactant. These values are for active ingredients based on total volume of cementitious slurry. Stated in terms of the water phase in the cementitious slurry, the surfactant is generally used in an amount within the range of about 0.05 to about 20 volume percent, preferably 0.2 to 10 volume percent, most preferably 2 to 7 volume percent based on the volume of water in the cementitious slurry. The surfactant can be either ionic, nonionic, or amphoteric, preferably nonionic or anionic, most preferably anionic, although all surfactants broadly are intended to be included. Suitable surfactants include 1. Alkanol amides (nonionic)

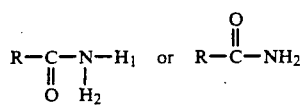

where R=a carbon chain (alkyl group) of 8-20 carbons (usually 10-18); $H_1$ and/or $H_2$ may be replaced by an alkanol such as ethanol or isopropanol. One or both of the H's may be replaced.

Examples: lauric monoisopropanol amide, lauric diethanol amide, coconut diethanoi amide. "ALKAMIDE 2106®" by Alkaril Chemicals, Ltd. is a coconut diethanoi amide suitable for this application.

2. Ethoxylated alkyl aryl sulfonate

Examples: nonyl phenol sulfonate with 8 moles ethylene oxide, and N-decyl benzene sulfonate with 6 moles ethylene oxide.

3. Amine oxides (nonionic)

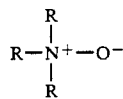

where R=alkyl carbon chains from 1 to 20 carbons, usually one chain is 10 to 18 carbons. Alkyl groups can have hydroxyl or amido functional groups in their chain.

Examples: bis(2-hydroxyethyl) coco amine oxide, bis(2-hydroxyethyl) laurel amine oxide, laurel dimethyl amine oxide, coco amidopropyl dimethyl amine oxide, cetyl dimethyl amine oxide, myristyl dimethyl amine oxide.

4. Betaines and Betains Derivatives

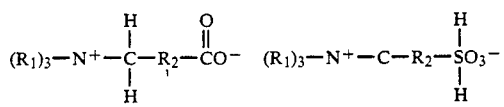

where $R_1$=alkyl chain length between 3 and 20 carbons, $R_2$=alkyl chain length between 1 and 4 carbons. Amide functional groups may be incorporated into the $R_1$ alkyl chain.

Examples: coco amido propyl betaine ($R_2$=propyl group 3 carbons), laurel betaine ($R_1$=laurel group of 12 carbons, no $R_2$), coco betains ($R_1$=coco group of 12-14 carbons, no $R_2$), oleyl betaine ($R_1$ - oleyl group of 18 carbons, no $R_2$), myristic betaine ($R_1$=myristyl group of 14 carbons, no $R_2$), oleamido propyl betaine, isostearamido propyl betaine, laurel sulfobetaine.

5. Ethoxylated Alcohols (nonionic)

Ethoxylated simple alcohols with linear or branched chains having between 8 and 20 carbons with 3 to 20 moles of ethylene oxide groups; 6-14 moles of ethylene oxide are typical.

Examples: $C_9$-$C_{11}$ linear alcohol with 8 moles ethylene oxide, $C_{14}$-$C_{15}$ linear alcohol with 13 moles ethylene oxide, $C_{12}$-$C_{15}$ linear alcohol with 9 moles ethylene oxide.

6. Sulfates and Sulfonates of Ethoxylated Alcohols (anionic)

The same ranges apply as in No. 5 supra except ethylene oxide moles may vary between 2 and 14.

Examples: $C_{12}$-$C_{13}$ linear alcohol sulfate or sulfonate with 3 moles ethylene oxide, $C_{12}$-$C_{15}$ linear alcohol sulfate or sulfonate with 3 moles ethylene oxide.

7. Ethoxylated Alkyl Phenols (nonionic)

Alkyl chains of 8 to 20 carbons, usually between 4 and 14 carbons and more preferred to be 8 or 9 carbons, with 4-20 moles of ethylene oxide, usually between 7 and 20 moles and more preferred to 8-12 moles.

Examples: Nonylphenol with 9 moles ethylene oxide, octylphenol with 8 moles ethylene oxide.

8. Sulfates or Sulfonates of Ethoxylated Alkyl Phenols (and their salts) (anionic)

Examples: Nonyl phenol sulfate or sulfonate with 9 moles ethylene oxide; octyl phenol sulfate or sulfonate with 8 moles ethylene oxide.

9. Fluorocarbon-based Surfactants (nonionic, amphoteric, anionic)

These must be water-soluble forms. Fluorocarbon esters such as 3M Company's FC-740 are oil soluble and not appropriate for this use. 3M Company's "FC-100", "FC-129", "FC-170C" are commercially available examples of fluorocarbon-based surfactants used in the invention.

Examples: Fluoro-octyl sulfonate or sulfate, perfluorated quaternary ammonium oxide, and fluorinated $C_9$-$C_{11}$ alcohols with 7 moles ethylene oxide.

10. Phosphate Derivatives of Ethoxylated Alcohols

Examples: $C_{14}$-$C_{16}$ linear alcohols phosphate with 8 moles ethylene oxide; phosphated nonylphenol with 10 moles ethylene oxide.

11. Quaternary Ammonium Chloride (cationic)

Dimethyl dicoco ammonium chloride, cetyl dimethyl benzyl ammonium chloride, cetyl dimethyl ammonium chloride.

12. Sulfates or Sulfonates of Alcohols (and their salts) (Anionic)

Sulfated simple alcohols with carbon chains of 8-20, usually between 10 and 16 and most common 10-12.

Examples: Sodium lauryl sulfate or sulfonate, potassium lauryl sulfate or sulfonate, magnesium lauryl sulfate or sulfonate, sodium n-decyl sulfate or sulfonate, triethanol amine laurel sulfate or sulfonate, sodium 2-ethylhexyl sulfate or sulfonate.

13. Condensation Products of Ethylene Oxide and Propylene Glycol (nonionic)

Examples: Propoxylated $C_9$-$C_{14}$ alcohols with 6 moles ethylene oxide.

Especially preferred are nonylphenol ethoxylates, coco amido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}$-$C_{15}$ linear alcohol ethoxylate sulfate, $C_9$-$C_{11}$ linear alcohol ethoxylate sulfates, sodium lauryl sulfate, and ethoxy alcohol sulfates.

Blast Furnace Slag Detail

By 'blast furnace slag' is meant the hydraulic refuse from the melting of metals or reduction of ores in a furnace. Such material is disclosed in the Hale and Cowan patent, U.S. Pat. No. 5,058,679 (Oct. 22, 1991), the disclosure of which is incorporated herein by reference.

The preferred blast furnace slag used in this invention is a high glass content slag produced by quickly quenching a molten stream of slag at a temperature of between 1400° C. and 1600° C. through intimate contact with large volumes of water. Quenching converts the molten stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Generally, the blast furnace slag used in this invention has a particle size such that it exhibits a Blaine specific surface area between 2,000 $cm^2/g$ and 15,000 $cm^2/g$, preferably between 3,000 $cm^2/g$ and 15,000 $cm^2/g$, more preferably between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: $SiO_2$, 30-40; $Al_2O_3$, 8-18; CaO, 35-50; MgO, 0-15; iron oxides, 0-1; S, 0-2 and manganese oxides, 0-2. A typical specific example is: $SiO_2$, 36.4; $Al_2O_3$, 16.0; CaO, 43.3; MgO, 3.5; iron oxides, 0.3; S, 0.5; and manganese oxides, <0.1.

Blast furnace slag having relatively small particle size is frequently desirable when used to form the cementitious slurry because of the greater strength it imparts in many instances to a final cement.

Characterized in terms of particle size the term "fine" can be used to describe particles with a Blaine specific surface area in the range of 4,000 to 7,000 $cm^2/g$, corresponding to 16 to 31 microns in size; "microfine" can be used to describe those particles with a Blaine specific surface area from greater than 7,000 $cm^2/g$ to 10,000 $cm^2/g$ that correspond to particles of 5.5-16 microns in size and "ultrafine" can be used to describe particles with a Blaine specific surface area over 10,000 $cm^2/g$ that correspond to particles 5.5 microns and smaller in size. Small particle size blast furnace slags are available from Blue Circle Cement Co., Koch Industries, Tulsa, Okla., under the trade name "WELL-CEM", and from Geochem under the trade name "MICROFINE MC100".

However, it is very time consuming to grind blast furnace slag to these particles sizes. It is not possible to grind blast furnace slag in a manner where particles are entirely one size. Thus, any grinding operation will give a polydispersed particle size distribution. A plot of particle size versus percent of particles having that size would thus give a curve showing the particle size distribution.

In accordance with a preferred embodiment of preparing the cementitious slurry using blast furnace slag, a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 25 wt %, more preferably 5 to 10 wt % can be ground to the ultrafine particle size and the remainder ground in a normal way thus giving particles generally in a size range of greater than 11 microns, the majority being in the 11 to 31 micron range.

Cementitious Slurry preparation

The amount of blast furnace slag will generally be in the range of from about 20 lbs/bbl to about 600 lbs/bbl, preferably 100 lbs/bbl to 500 lbs/bbl, most preferably 150 lbs/bbl to 350 lbs/bbl based on the barrels of cementitious slurry. This cementitious slurry can be made by combining the blast furnace slag with water or with drilling fluid as disclosed in the Hale and Cowan patent incorporated herein by reference.

The use of slag as the hydraulic material gives a final cementitious slurry which is not weakened in the manner that would be the case with Portland cement if the slurry is more dilute. On the other hand, additional slag does not impart extremely high viscosity to the slurry and thus a higher concentration of hydraulic material can be used if desired. Thus if the cementitious slurry is to be made by combining blast furnace slag with drilling fluid, this can be done simply by adding the blast furnace slag directly to the drilling fluid.

However, in the preferred method of using drilling fluid in the cementitious slurry preparation, the drilling fluid is utilized and thereafter diluted prior to or during the addition of blast furnace slag (or additional blast furnace slag if blast furnace slag is present in the drilling fluid). The dilution fluid can be the same as the liquid used to make the drilling fluid or it can be different. Thus, the density of the drilling fluid can be chosen in the first place to be sufficient to avoid inflow into the wellbore because of formation pressure but insufficient to rupture the wellbore wall and force fluid out into the formation. By utilizing the dilution and thereafter the addition of additional blast furnace slag, the cementitious slurry can also have the density tailored to the particular operation the same as the drilling fluid.

The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the diluent added to the flowing stream. Thereafter, the additional blast furnace slag is added. This avoids highly viscous cementitious slurry compositions and allows all of the pumping to be done with piping and pumps associated with the well rig without the need for pumps designed for pumping cement. Thus, it is possible to tailor the final density of the cementitious slurry, if desired, to a value within the range of 30% less to 70% more than the original density of the drilling fluid preferably within the range of 15% less to 50% more, most preferably essentially the same, i.e., varying by no more than ±5 weight percent.

Activator System

The blast furnace slag cementitious slurry generally contains an activator system to speed up the setting process.

Suitable activators include lithium hydroxide, lithium carbonate, sodium silicate, sodium fluoride, sodium silicofluoride, magnesium hydroxide, magnesium oxide, magnesium silicofluoride, zinc carbonate, zinc silicofluoride, zinc oxide, sodium carbonate, titanium carbonate, potassium carbonate, sodium hydroxide, potassium hydroxide, potassium sulfate, potassium nitrite, potassium nitrate, calcium hydroxide, sodium sulfate, copper sulfate, calcium oxide, calcium sulfate, calcium nitrate, calcium nitrite, and mixtures thereof. A mixture of caustic soda (sodium hydroxide) and soda ash (sodium carbonate) is preferred because of the effectiveness and ready availability. When mixtures of alkaline agents such as caustic soda and soda ash are used the ratio can vary rather widely since each will function as an accelerator alone. Preferably, about 1 to 20 lbs/bbl of caustic soda, more preferably 2 to 6 lbs/bbl of caustic soda are used in conjunction with from 2 to 50 lbs/bbl, preferably 2 to 20 lbs/bbl of soda ash. The references to 'lbs/bbl' means pounds per barrel of final cementitious slurry.

In some instances, it may be desirable to use a material for a particular effect along with the activator even though it may also act as a retarder. For instance, a chromium lignosulfonate may be used as a thinner in the cementitious slurry along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, phenol sulfonate, dodecylbenzene sulfonate, and mixtures thereof.

EXAMPLE 1

This Example shows the advantages of using a surfactant in the blast furnace slag cementitious system which is used to displace an oil based drilling fluid. This Example contrasts the results obtained with and without the addition of the surfactant to a blast furnace slag cementitious slurry used to directly displace the oil based mud. This Example exemplifies the advantage of using a surfactant in a blast furnace slag cementitious slurry when directly displacing an oil base mud.

| 14 lg/gal Cementitious Slurry | SM-1 | SM-2 |
| --- | --- | --- |
| PHB slurry[1], bbl | 0.067 | 0.067 |
| Seawater, bbl | 0.58 | 0.58 |
| "SPERSENE[2]", lb/bbl | 2.0 | 2.0 |
| "RESINEX[3]", lb/bbl | 4.0 | 4.0 |
| "HALAD 413[4]", lb/bbl | 3.0 | 3.0 |
| NaOH, lb/bbl | 1.25 | 1.25 |
| NaCO$_3$, lb/bbl | 3.0 | 3.0 |
| "NEWCEM[5]", lb/bbl | 350 | 350 |
| Surfactant[6], lb/bbl | 0 | 8.3 |

[1]Fresh water slurry containing 30 lbs prehydrated bentonite per barrel
[2]Trade name of MI Drilling Fluids for chrome lignosulfonate dispersant
[3]Trade name of MI Drilling Fluids for sulfonated lignite/resin dispersant and fluid loss control agent
[4]Trade name of Halliburton polymer-grafted lignosulfonate fluid loss additive
[5]Trade name of Blue Circle Cement Co. for ground blast furnace slag of about 5500 Blaine Specific Surface Area
[6]An ethoxylated linear alcohol sulfate

| | FANN VISCOSITY DATA AT ROOM TEMPERATURE | | | | | | | | | | |
| --- | --- | --- | --- | --- | --- | --- | --- | --- | --- | --- | --- |
| | Composition, Vol % | | | Torque Readings at Variable RPMs | | | | | | Plastic Viscosity | Yield Point | Gel Strength[+++] |
| Run | SM-1 | SM-2 | NDM[++] | 600 | 300 | 200 | 100 | 6 | 3 | CP | lb/100 ft$^2$ | lb/100 ft$^2$ |
| 1 | 100 | | | 29 | 15 | 10 | 6 | 1 | 1 | 14 | 1 | 1/- |
| 2 | | 100 | | 52 | 27 | 19 | 10 | 1 | 1 | 25 | 2 | 1/8 |
| 3 | | | 100 | 112 | 61 | 43 | 24 | 5 | 4 | 51 | 10 | 7/12 |
| 4 | 75 | | 25 (A) | 193 | 125 | 95 | 53 | 5 | 3 | 68 | 57 | 7/- |
| 5 | 50 | | 50 (B) | 295 | 138 | 103 | 69 | 20 | 19 | 157 | −19 | 30/- |
| 6 | 25 | | 75 (C) | 98 | 49 | 33 | 20 | 5 | 4 | 49 | 0 | 5/- |
| 7 | | 75 | 25 (D) | 266 | 163 | 102 | 70 | 4 | 4 | 103 | 60 | 12/- |
| 8 | | 50 | 50 (E) | 192 | 107 | 77 | 55 | 13 | 9 | 85 | 22 | 9/- |
| 9 | | 25 | 75 (F) | 111 | 60 | 44 | 25 | 4 | 3 | 51 | 9 | 4/- |

(A) A slightly grainy mix. No large drops of NDM visible but not as smooth as Run 7
(B) Heavy, lumpy, large curds of SM-1 within the oil base: Severe settling
(C) Small flocs of SM-1 within the oil base mud: Severe settling
(D) Very smooth Mix, no visible drops of NDM, within the SM-1, i.e., H$_2$O external.
(E) Small flocs of SM-2 within the oil base mud.
(F) Very smooth mix, no visible drops of SM-2 within the oil base mud.
[++]11.9 lb/gal "NOVADRILL[1]" mud of the following composition:

| | |
| --- | --- |
| "NOVASOL[2]", bbl | 0.55 |
| CaCl$_2$ brine, bbl | 0.26 |
| "NOVAMUL[3]", lbs | 5 |
| "NOVAWET[4]", lbs | 2 |
| Lime, lbs | 6 |
| VG-69[5], lbs | 4 |

FANN VISCOSITY DATA AT ROOM TEMPERATURE -continued

| | Composition, Vol % | | | Torque Readings at Variable RPMs | | | | | | Plastic Viscosity | Yield Point | Gel Strength+++ |
|---|---|---|---|---|---|---|---|---|---|---|---|---|
| Run | SM-1 | SM-2 | NDM++ | 600 | 300 | 200 | 100 | 6 | 3 | CP | lb/100 ft² | lb/100 ft² |
| Barite, lbs | | 216 | | | | | | | | | | |

[1]Trade name of MI Drilling Fluids for drilling fluid containing sheen-free synthetic oil
[2]Trade name of MI Drilling Fluids for sheen-free synthetic oil
[3]Trade name of MI Drilling Fluidds for primary emulsifier
[4]Trade name of MI Drilling Fluids for secondary wetting agent
[5]Trade name of MI Drilling Fluids for gelling agent, an organophilic clay As can be seen, the surfactant-containing cementitious slurry, SM-2, gave less mud contamination at all three of the component ratios tested (i.e., as shown by comparing footnote A vs. D, B vs. E, or C vs. F.) Also, while there is some scatter in the data, at a 50/50 ratio of components (Run 8) the viscosity values were excellent for the mixtures formed from the surfactant-containing blast furnace slag cementitious slurry (SM-2).

However, Run 5 and Run 6 for the mixtures formed from the blast furnace slag cementitious slurry (SM-1) having no surfactant had a negative or zero yield point which strongly indicates that the mixtures are settling fluids.

While this invention has been described in detail for the purpose of illustration, it is not to be construed as limited thereby, but is intended to cover all the changes and modifications within the spirit and scope thereof.

What is claimed is:

1. A method for drilling and cementing a well, comprising:
    drilling a borehole utilizing an oil based drilling fluid, thus producing a used oil based drilling fluid to be displaced out of the borehole;
    combining ingredients comprising water, blast furnace slag and a surfactant to produce a cementitious slurry;
    disposing a pipe within said borehole;
    passing said cementitious slurry into said borehole thus at least partially displacing said used oil based drilling fluid by direct fluid contact with said cementitious slurry; and
    displacing said cementitious slurry into an annulus surrounding said pipe.

2. A method according to claim 1 wherein said surfactant is selected from an ethoxylated linear alcohol sulfonate, cocoamidopropyl betaine and ethoxylated nonyl phenol and wherein said cementitious slurry comprises in addition an activator.

3. A method according to claim 1 wherein said oil-based drilling fluid is an invert emulsion and water of an internal phase thereof contains dissolved calcium chloride and wherein said cementitious slurry comprises in addition an activator.

4. A method according to claim 3 wherein said surfactant is present in an amount within the range of 0.2 to 10 volume percent based on the volume of water in said cementitious slurry.

5. A method according to claim 3 wherein said surfactant is present in an amount within the range of 0.1 to 15 lbs/bbl based on the barrels of said cementitious slurry.

6. A method according to claim 3 wherein said activator is selected from the group consisting of sodium silicate, sodium fluoride, sodium silicofluoride, magnesium silicofluoride, magnesium hydroxide, magnesium oxide, zinc silicofluoride, zinc oxide, zinc carbonate, titanium carbonate, sodium carbonate, potassium sulfate, potassium nitrate, potassium nitrite, potassium carbonate, sodium hydroxide, potassium hydroxide, copper sulfate, lithium hydroxide, lithium carbonate, calcium oxide, calcium nitrate, calcium nitrite, calcium hydroxide, sodium sulfate and mixtures thereof.

7. A method according to claim 1 wherein said surfactant is present in an amount within the range of 0.2 to 10 volume percent based on the volume of water in said cementitious slurry.

8. A method according to claim 1 wherein said surfactant is present in an amount within the range of 0.1 to 15 lbs/bbl based on the barrels of said cementitious slurry.

9. A method according to claim 1 wherein said drilling fluid is an invert emulsion.

10. A method according to claim 1 wherein said drilling fluid is a low water content-oil based drilling fluid.

11. A method according to claim 1 wherein 5 to 25% of said blast furnace slag has an ultrafine particle size.

12. A method according to claim 1 wherein said cementitious slurry comprises in addition a mixture of sodium hydroxide and sodium carbonate and wherein said cementitious slurry contains 150 to 350 lbs/bbl of said blast furnace slag and wherein said pipe has a diameter of 16 inches or greater 13. A method according to claim 1 wherein said cementitious slurry is displaced using a displacement fluid comprising drilling fluid.

14. A method according to claim 1 wherein said pipe is a casing and said annulus is the annulus between said casing and said borehole.

15. A method according to claim 1 wherein said pipe is a liner and said annulus is the space between said liner and a casing.

16. A method according to claim 1 wherein said oil of said oil based drilling fluid is selected from the group consisting of mineral oil; diesel oil; crude oil; sheen-free synthetic hydrocarbon oil; vegetable oil; and an ester oil.

17. A method for drilling and cementing a well comprising:
    drilling a wellbore utilizing an oil based drilling fluid, thus producing a used oil based drilling fluid to be displaced out of the borehole;
    combining ingredients comprising seawater, blast furnace slag having a particle size such that it exhibits a Blaine specific surface area within the range of 4,000 cm²/g to 9,000 cm²/g, an anionic surfactant, an activator system comprising 2 to 6 lbs/bbl of caustic soda in conjunction with 2 to 20 lbs/bbl of soda ash, a chrome-free lignosulfonate dispersant, prehydrated bentonite clay, a sulfonated lignite/resin dispersant and fluid loss agent, and a polymer-grafted lignosulfonate fluid loss additive to produce a cementitious slurry;

disposing a pipe within said borehole;
passing said cementitious slurry into said borehole thus at least partially displacing said used oil based drilling fluid by direct fluid contact with said cementitious slurry; and
displacing said cementitious slurry into an annulus surrounding said pipe by direct fluid contact with a seawater displacement fluid.

18. A method for drilling and cementing a well, comprising:
drilling a borehole utilizing an oil based drilling fluid, thus producing a used oil based drilling fluid;
combining a portion of said used oil based drilling fluid with blast furnace slag, a surfactant and an activator system to produce a cementitious slurry;
disposing a pipe within said borehole;
passing said cementitious slurry into said pipe in direct fluid contact with said used drilling fluid;
introducing a displacement fluid into said pipe in direct fluid contact with said cementitious slurry; and
displacing said cementitious slurry down said pipe and up into an annulus surrounding said pipe.

19. A method according to claim 18 wherein said used drilling fluid is diluted before said combining with said blast furnace slag.

20. A method according to claim 19 wherein said used drilling fluid is diluted by adding a diluent to a flowing stream of said used drilling fluid.

* * * * *